United States Patent
Mosek

(10) Patent No.: US 8,131,864 B2
(45) Date of Patent: *Mar. 6, 2012

(54) METHODS AND SYSTEMS FOR COMMUNICATING WITH STORAGE SYSTEMS USING SLIM IP STACKS

(75) Inventor: Amir Mosek, Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,639

(22) Filed: Dec. 16, 2010

(65) Prior Publication Data

US 2011/0087790 A1    Apr. 14, 2011

Related U.S. Application Data

(63) Continuation of application No. 11/969,929, filed on Jan. 7, 2008, now Pat. No. 7,882,249.

(51) Int. Cl.
*G06F 15/16* (2006.01)

(52) U.S. Cl. ........................................ 709/228; 709/227
(58) Field of Classification Search .................. 709/224, 709/227, 228, 229, 230
See application file for complete search history.

*Primary Examiner* — Joseph Avellino
*Assistant Examiner* — Marshall McLeod
(74) *Attorney, Agent, or Firm* — Martine Penilla Group, LLP

(57) ABSTRACT

Methods, and associated devices, media, and systems, for establishing a communication link between a host system and a storage device are provided. One method includes an operation for providing on the host a communication stack including a Transmission Control Protocol/Internet Protocol (TCP/IP) module and a host physical layer module. The storage device includes a storage command extractor, and the method includes another operation for establishing a communication channel between an application in the host and the storage device, where the communication channel uses the communication stack and the storage command extractor. In the method, the TCP/IP module converts TCP/IP commands received from the application in the host to storage commands for the storage device.

17 Claims, 4 Drawing Sheets

METHODS AND SYSTEMS FOR COMMUNICATING WITH STORAGE SYSTEMS USING SLIM IP STACKS

CLAIM OF PRIORITY

This application is a Continuation Application under 35 USC §120 and claims priority from U.S. application Ser. No. 11/969,929 entitled "METHODS AND SYSTEMS FOR COMMUNICATING WITH STORAGE SYSTEMS USING SLIM IP STACKS", filed on Jan. 7, 2008, now U.S. Pat. No. 7,882,249 and is herein incorporated by reference.

BACKGROUND

Example embodiments described herein relate to methods and systems for communicating with storage devices using slim IP stacks.

Communication protocols (e.g. Transmission Control Protocol/Internet Protocol (TCP/IP) and protocols based on the Open Systems Interconnection basic reference model (OSI model)) are configured specifically for networking applications including the Internet. Such protocols are often developed with a single purpose in mind, specifically network communication. Applications may communicate over a network using different communication protocols. Besides there being a wide array of applications and protocols, the network hardware (e.g. receivers, transmitters, and cables) can differ from device to device. The OSI model utilizes a multi-level scheme to provide a flexible solution that accommodates all such variation with a standard interface.

Because each protocol module usually communicates with two other modules, the modules are commonly referred to as "layers" in a stack of protocols. In the OSI model, there are seven layers. The layers are: application, presentation, session, transport, network, data link, and physical. A layer is a collection of related functions that provides services to the layer above it and receives service from the layer below it. The lowest layer (known as the physical layer) always deals with low-level, physical interaction of the hardware. Every higher layer adds more features. User applications usually deal only with the top-most layers (known as the application and presentation layers in OSI).

The TCP/IP reference model consists of four layers (application, transport, internet, network access). The network access layer may be thought of as a "bundling," of the network, data link, and physical layers in the OSI model, and the application layer may be thought of as a "bundling" of the application and presentation layers in OSI. An example of the layers in a TCP/IP implementation for accessing the Internet, in top-down hierarchy, is as follows:

(1) Ethernet and R45/CATS (network-access layer):
(2) IP commands (internet layer);
(3) TCP commands (transport layer); and
(4) web browser commands such as http (application layer).

TCP/IP enables features that currently are not supported by logical block addressing (LBA) architecture typically used to access storage devices. However, TCP/IP (and communication protocols based on OSI) is mostly suited to communication between applications executed from different systems (e.g. different operating system and hardware) to communicate with each other in a standard way. Furthermore, extensive modifications to LBA architecture and associated applications are necessary in order to employ LBA as a standard in security and communication applications between client and server applications, for example.

Storage devices that utilize LBA architecture (e.g. file system and block device driver) provide a standard command for retrieving information from the storage device (e.g. vendor ID/name). Such a configuration only partially solves the problem of obtaining the properties (e.g. security and compression properties) of the storage device, since the storage device is limited to export only standard capabilities, not proprietary ones Implementation of TCP/IP in storage-device architectures has not been utilized in the art for such data-access applications.

Network chip developers have implemented the full TCP/IP stack as hardware components. Furthermore, simple tasks that do not require the full TCP/IP stack have been handled by reduced stacks in which the upper layers are not implemented. Examples of tasks using such implementations include the "ping" operation in which only the network-access layer is needed, and the User Datagram Protocol (UDP), a broadcast protocol that uses only the three lower layers of a standard TCP/IP stack (i.e. network-access, internet, and transport layers). Such approaches are not capable of handling applications that require the use of the application layer of the standard TCP/IP stack.

It would be desirable to have methods and systems for communicating with storage devices using slim IP stacks.

SUMMARY

The example embodiments described herein provide methods and systems for communicating with storage devices using slim IP stacks.

In one embodiment, a method includes an operation for providing on the host a communication stack including a Transmission Control Protocol/Internet Protocol (TCP/IP) module and a host physical layer module. The storage device includes a storage command extractor, and the method includes another operation for establishing a communication channel between an application in the host and the storage device, where the communication channel uses the communication stack and the storage command extractor. In the method, the TCP/IP module converts TCP/IP commands received from the application in the host to storage commands for the storage device.

In another embodiment, a method for establishing a communication link between a host and a storage device is provided. The host includes a communication stack with a TCP/IP module and a host physical layer module. The method includes an operation for providing on the storage device a storage-command interpreter and a storage physical layer module. In another operation of the method, a communication channel is established between an application in the host and the storage device, the communication channel using the communication stack, the storage-command interpreter and the storage physical layer module. The TCP/IP module transfers application data without TCP/IP headers, and the TCP/IP module converts TCP/IP commands received from the application into physical port driver commands sent to the host physical layer module.

In yet another embodiment, a storage device for communicating with a host system is provided. The storage device includes a storage command extractor and a storage-command module. The storage command extractor is in communication with a host physical layer, and the host includes a TCP/IP module and a host physical layer module. The storage-command module is connected to the storage command extractor, and a communication channel is established between an application in the host and the storage device, the communication channel using said TCP/IP module and said storage command extractor. Further, the TCP/IP module converts TCP/IP commands received from an application in the host to storage commands for the storage device.

Example embodiments described herein teach storage-device drivers that emulate a full TCP/IP stack without implementing the standard TCP/IP stack, for allowing communication between the storage device and a host system. The driver executed on the host-system side exports the same application programming interface (API) to the application layer that is exported by a standard TCP/IP stack, via a TCP/IP emulator. However, the driver executed on the storage-device side does not manipulate data that is sent/received to/from the storage device from/to the host system; the driver only transfers the data (i.e. there is no internal data-formatting performed by the driver).

The need for such internal data-formatting can be eliminated—and the standard TCP/IP stack can be reduced to a slim IP stack (i.e. obviating the need to implement the whole standard TCP/IP stack)—when the storage device has available to it a clear identifier (such as a specific IP address or the storage name www.myStorage.com embedded into the command parameters that the TCP/IP stack receives from the application layer running on the host side). Reasons for this are as follows.

Given that a clear identifier is available to the storage device, data, commands, or other designations (for simplicity, referred to in the discussion immediately hereafter as "designations") can be sent from a host system directly to the storage device without being routed through a network, which is ordinarily used to direct the designations to their correct destinations. Since designations are sent directly from the host system to the storage device, not via a network, there is no need to employ (1) headers (which are used to route the designations to their correct destinations), or (2) footers, which contain a checksum used to correct errors generated by going through the network.

In addition, since the designations are sent directly from the host system to the storage device, not via a network, there is no need to (3) divide the a designation into "chunks" or packets (which is performed in network routing to improve efficiency of transmission), or (4) to manage timeouts, since security and other concerns addressed by a timeout functionality are, at least to a significant extent, rendered moot since designations are transmitted directly from the host system to the storage device without going through a public network.

Since the direct transmission of designations from the host system to the storage device obviates the need for items (1), (2), (3), and (4), there is no need for intermediate layers between the physical layers) and the application layer(s) of a communication stack, because the purpose of such intermediate layers is specifically to handle items (1), (2), (3), and (4), and other issues that arise due to the fact that designations are transmitted from the host system to the storage device indirectly (i.e. via a network).

In this way, then, it is understood that the provision of a clear identifier for a storage device, which enables direct transmission of designations from a host system to the storage device, without going through a network, eliminates the need for the layers intermediate to the application and the physical layers. Such an identification scheme can be a parameter that is embedded into the command parameters (sent by the application layers or the physical layers to the TCP/IP emulator), and that indicates that the storage device is the destination device. Examples of identifiers include (1) the name of the storage device (e.g. "my storage") or (2) static-IP addresses.

Example embodiments described herein can improve the performance and power consumption of a storage device, and in turn reduce the cost, by eliminating the layers of an IP stack that require hardware logic.

BRIEF DESCRIPTION OF THE DRAWINGS

Example embodiments are herein described, with reference to the accompanying drawings, wherein.

DETAILED DESCRIPTION

The Applicants formally retract the arguments made in the parent application, as the parent application presented claim language that may have been narrower or different from what is being presented in this present application. For this reason, the Examiner is respectfully requested to review each of the claim elements in this continuation application anew and also reconsider each of the prior art references considered during the prosecution of the parent application as they may apply differently to what is claimed in this continuation application.

Example embodiments described herein relate to methods and systems for communicating with storage devices using slim IP stacks. The principles and operation for communicating with storage devices using slim IP stacks, according to example embodiments described herein, may be better understood with reference to the accompanying description and the drawings.

Figure 1:
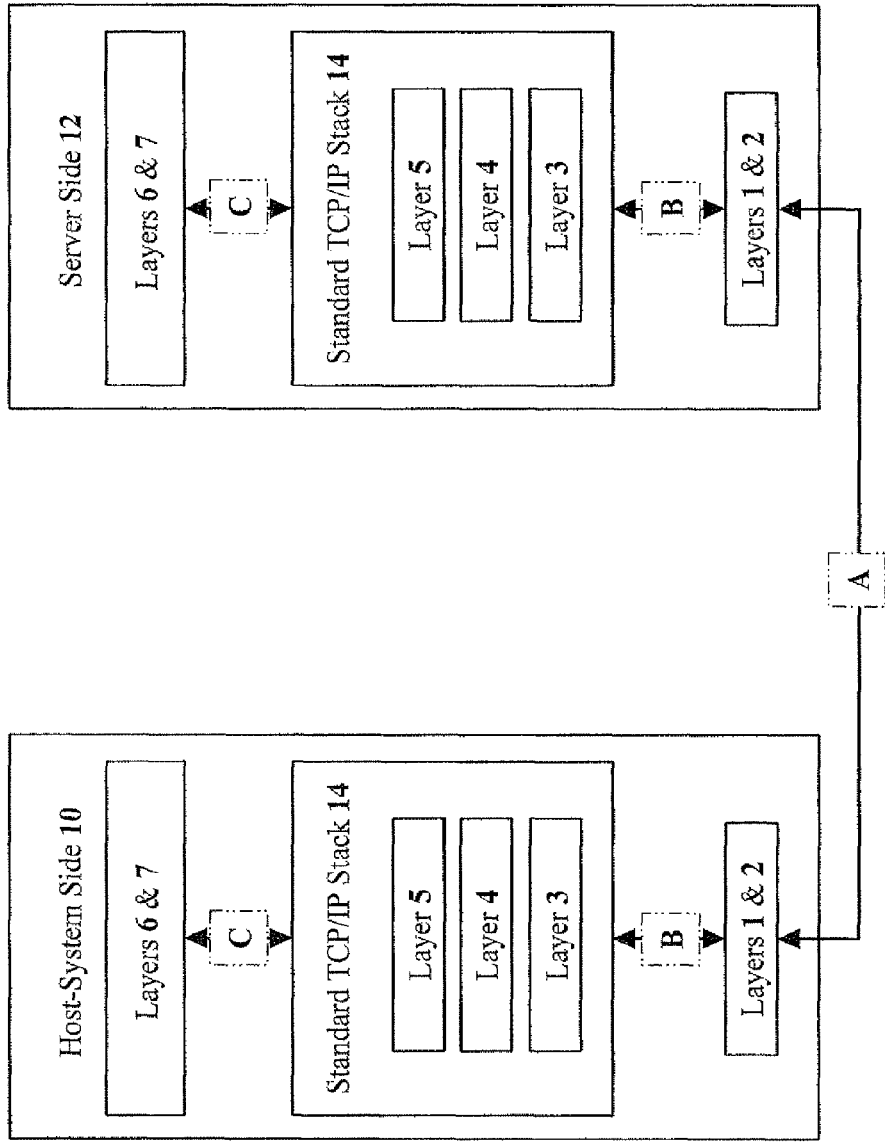
FIG. 1 is a simplified schematic block diagram of an implementation of a communication architecture using a standard TCP/IP stack, according to the prior art.

Referring now to the drawings, FIG. 1 is a simplified schematic block diagram of an implementation of a communication architecture using a standard TCP/IP stack, according to the prior art. For clearer understanding, the seven layers of the OSI model are used in FIG. 1. In a host-system side 10 (e.g. of a web browser) and a server side 12 (e.g., of an http or file server), a standard TCP/IP stack 14 is shown having layers 3, 4, and 5. Layer 3 corresponds to IP-address manipulation, Layer 4 corresponds to checksum operations and data segmentation, and Layer 5 corresponds to open/close socket and send/receive operations.

The above mentioned OSI layers may be implemented in TCP/IP systems in the following software or hardware module configurations: Layers 1 & 2 (as well as layers 6 & 7) are shown outside standard TCP/IP stack 14 as separated software or hardware modules because these layers are retained in example embodiments described herein. Layer 1 corresponds to the physical interface bus, and Layer 2 corresponds to the interface driver. Layers 6 & 7 correspond to application commands (e.g. http and API commands). Communication between host-system side 10 and server side 12 is enabled by a data-transport interface A via their respective pairs of layers 1 & 2. Data is exchanged with respective TCP/IP stacks 14 via respective data-link interfaces B. Data is exchanged with applications via respective TCP/IP stack interfaces C.

Figure 2:
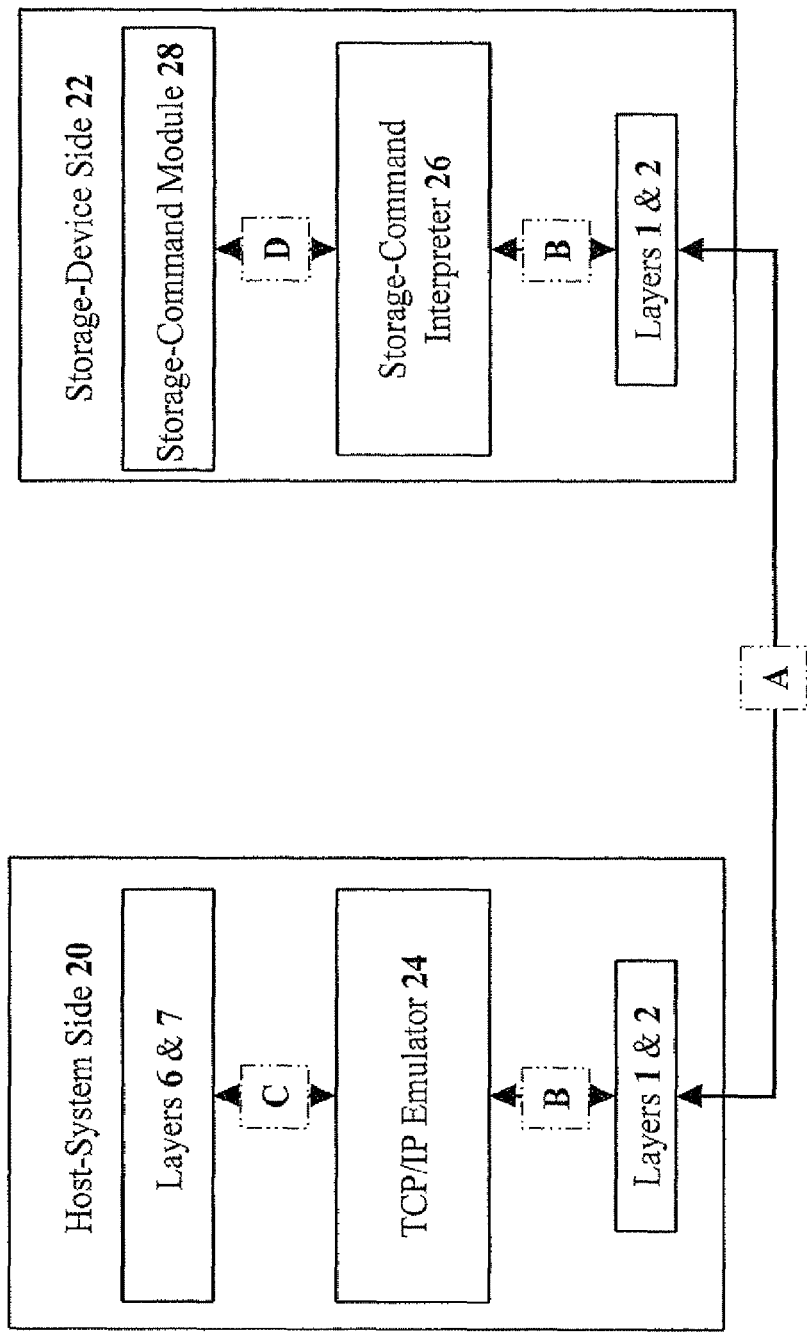
FIG. 2 is a simplified schematic block diagram of an implementation of a communication architecture using a slim TCP/IP stack, according to example embodiments described herein.

FIG. 2 is a simplified schematic block diagram of an implementation of a communication architecture using a slim TCP/IP stack, according to example embodiments described herein. A host-system side 20 and a storage-device side 22 are shown in FIG. 2, each having layers 1 & 2 as in FIG. 1. Communication is enabled by data-transport interface A. In host-system side 20, data is exchanged to/from layers 1 & 2 from/to a TCP/IP emulator 24 via data-link interface B. Data is exchanged to/from TCP/IP emulator 24 from/to layers 6 & 7 via TCP/IP stack interface C. TCP/IP emulator 24 provides the requisite data handling for applications to properly recognize and execute data operations and application commands.

More specifically, TCP/IP emulator 24 converts the TCP/IP commands from TCP/IP interface C commands into physical port-driver commands sent via interface B. This is mainly done by encapsulating (i.e. wrapping the TCP/IP commands with header and footers of the commands used by the physical port-driver interface) the TCP/IP commands received via interface C into physical port driver commands that are sent via interface B.

Layers 1 & 2 and layers 6 & 7 have been used to show relation to the TCP/IP scheme and the OSI model. However, layers 1 & 2 and layers 6 & 7 are considered "bundled" layers. That is, layers 1 & 2 are considered a "bundled" physical layer, and layers 6 & 7 are considered a "bundled" application layer.

Thus, the slim TCP/IP stack of FIG. 2 implements the seven OSI layers into three modules (an application-layer module, a physical-layer module, and a TCP/IP-emulator module). TCP/IP emulator 24 effectively replaces (though it does not perform identical functions as) OSI layers 3, 4, and 5.

In storage-device side 22, data is exchanged to/from layers 1 & 2 from/to a storage-command interpreter 26 via data-link interface B. Storage-command interpreter 26 converts the TCP/IP commands to storage commands. Storage-command interpreter 26 then sends the storage commands to storage-command module 28 via a storage-command interface D. Storage-command module 28 is a repository of storage commands (e.g. store, load, encrypt, compress) that can be selected for execution by storage-command interpreter 26. In such an implementation, layers 1 & 2 are standard storage-device connectors and associated physical-port drivers, respectively (e.g. USB, SD, and MMC).

Figure 3:
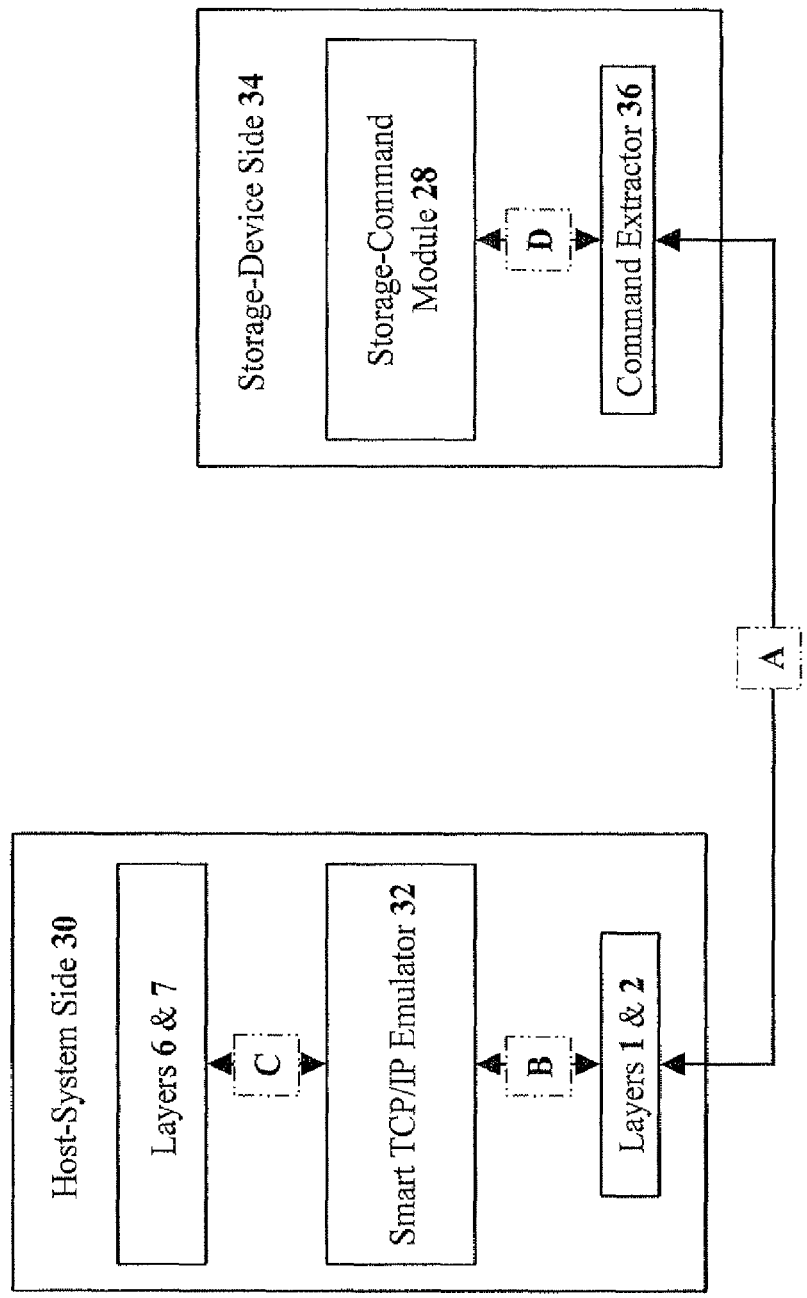
FIG. 3 is a simplified schematic block diagram of an implementation of a communication architecture using an alternative slim TCP/IP stack, according to example embodiments described herein.

FIG. 3 is a simplified schematic block diagram of an implementation of a communication architecture using an alternative slim TCP/IP stack, according to example embodiments described herein. A host-system side 30 is shown having a smart TCP/IP emulator 32. Smart TCP/IP emulator 32 in host-system side 30 differs from TCP/IP emulator 24 of FIG. 2 as smart TCP/IP emulator 32 of FIG. 3 includes the functions of converting TCP/IP commands received via interface C to storage-commands. In FIG. 3, the interpretation of the TCP/IP commands herein is performed inside the host system, in contrast to storage-command interpreter 26 of FIG. 2, which converts the TCP/IP commands to storage commands inside the storage device.

Smart TCP/IP emulator 32 also encapsulates the storage commands into specific physical port-driver commands. The storage-command instructions are sent to a storage-device side 34 over interface A. A command extractor 36 extracts the storage commands that were encapsulated by smart TCP/IP emulator 32, and sends the commands via interface D) to storage-command module 28. Storage-command module 28 receives the storage commands, and executes the appropriate storage-operations.

Figure 4:
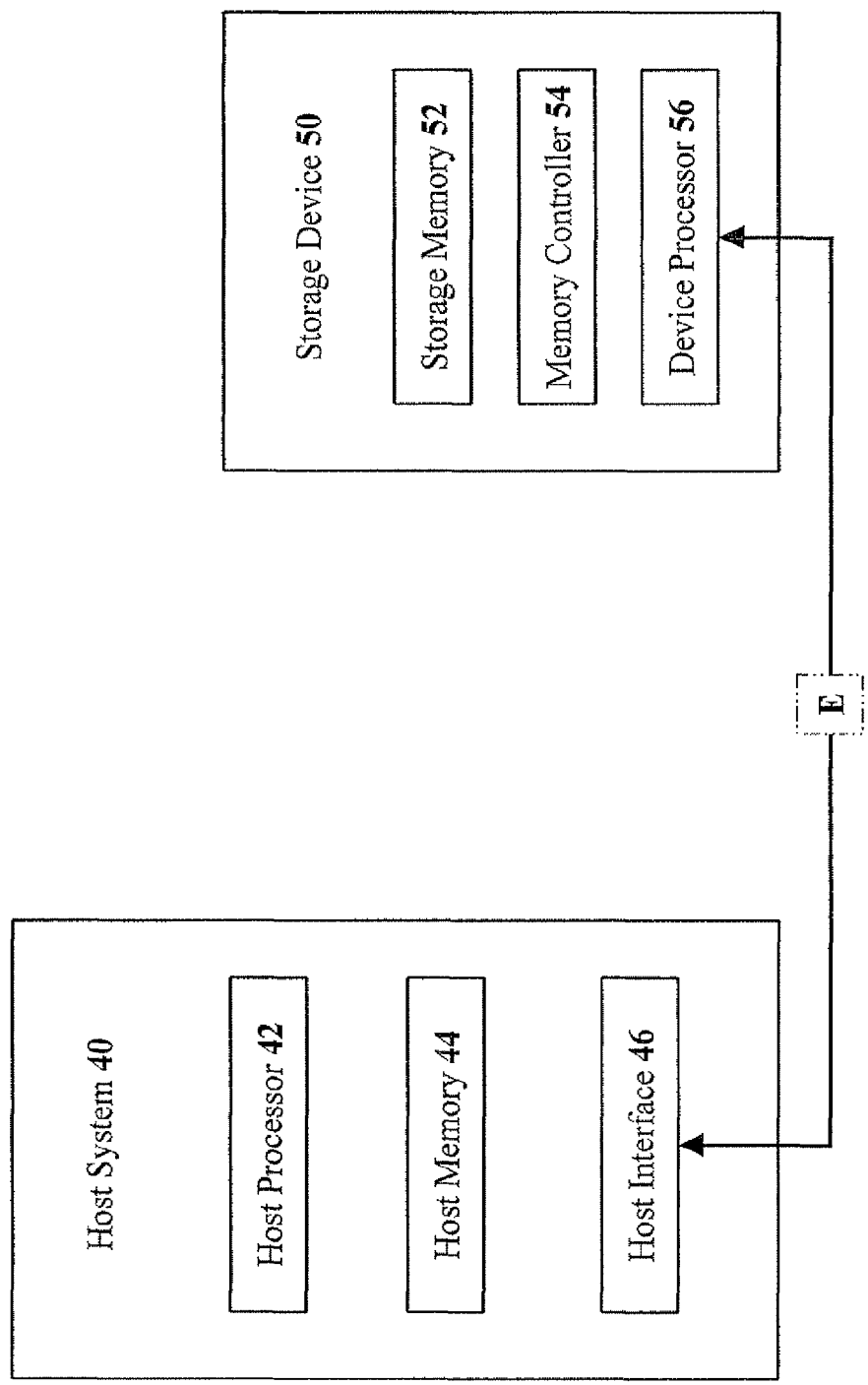
FIG. 4 is a simplified schematic block diagram of a host system configured to communicate with a storage device using a slim TCP/IP stack, according to example embodiments described herein.

FIG. 4 is a simplified schematic block diagram of a host system configured to communicate with a storage device using a slim TCP/IP stack, according to example embodiments described herein. A host system 40 (e.g. a cellular phone, a PDA, a laptop computer, or a desktop computer) having a host processor 42, a host memory 44, and a host interface 46 is shown. A storage device 50 (e.g. SIM card, a USB flash-memory device, an MMC card, or an SD card) is shown having a storage memory 52, a memory controller 54, and, optionally, a device processor 56. Host system 40 is operationally connected to storage device 50 via a connection interface E. It is noted that while host system 40 and storage device 50 are shown as separate components in FIG. 4, storage device 50 may reside within host system 40 as an internally-engageable component or an embedded component of host system 40.

While the invention has been described with respect to a limited number of example embodiments, it will be appreciated that many variations, modifications, and other applications of the invention may be made.

What is claimed is:

1. A method for establishing a communication link between a host and a storage device, the method comprising the steps of:
   providing on the host a communication stack including a TCP/IP module and a host physical layer module;
   providing on the storage device a storage command extractor; and
   establishing a communication channel between an application in the host and the storage device, said communication channel using said communication stack and said storage command extractor;
   wherein the TCP/IP module converts TCP/IP commands received from the application in the host to storage commands for the storage device.

2. The method as recited in claim 1, wherein the TCP/IP module encapsulates the storage commands into physical port driver commands.

3. The method as recited in claim 1, wherein the storage command extractor extracts the storage commands received from the TCP/IP module.

4. The method as recited in claim 3, further including:
   sending the storage commands extracted by the storage command extractor to a storage command module.

5. The method as recited in claim 4, further including:
   executing by the storage command module storage operations corresponding to the storage commands.

6. The method as recited in claim 1, wherein the TCP/IP module transfers application data without TCP/IP footers.

7. The method as recited in claim 1, wherein the TCP/IP module does not segment application data into multiple TCP/IP packets.

8. The method as recited in claim 1, wherein the TCP/IP module does not manage TCP timeouts.

9. A method for establishing a communication link between a host and a storage device, the method comprising the steps of:
   providing on the host a communication stack including a TCP/IP module and a host physical layer module;
   providing on the storage device a storage-command interpreter and a storage physical layer module; and
   establishing a communication channel between an application in the host and the storage device, said communication channel using said communication stack, said storage-command interpreter and said storage physical layer module;

wherein the TCP/IP module,
transfers application data without TCP/IP headers, and
converts TCP/IP commands received from the application into physical port driver commands sent to the host physical layer module.

10. The method as recited in claim 9, wherein establishing the communication channel includes addressing the storage device by a static IP address, and wherein a storage identifier is embedded into one of command parameters sent by said application to said TCP/IP module.

11. A storage device for communicating with a host system, the storage device comprising:
a storage command extractor in communication with a host physical layer, the host further including a TCP/IP module and a host physical layer module; and
a storage-command module connected to the storage command extractor;
wherein a communication channel is established between an application in the host and the storage device, said communication channel using said TCP/IP module and said storage command extractor;
wherein the TCP/IP module converts TCP/IP commands received from an application in the host to storage commands for the storage device.

12. The storage device of claim 11 configured as one of a SIM card, a USB flash-memory device, an MMC card, or an SD card.

13. The storage device of claim 11, wherein said host is configured as one of a cellular phone, a PDA, a laptop computer, or a desktop computer.

14. The storage device of claim 11, wherein the TCP/IP module encapsulates the storage commands into physical port driver commands.

15. The storage device of claim 11, wherein the storage command extractor extracts the storage commands received from the TCP/IP module.

16. The storage device of claim 11, further including:
a storage command module, wherein the storage commands extracted by the storage command extractor are sent to the storage command module.

17. The storage device of claim 16, wherein the storage command module executes storage operations corresponding to the storage commands.

* * * * *